(12) United States Patent
Reisch et al.

(10) Patent No.: US 7,485,061 B2
(45) Date of Patent: Feb. 3, 2009

(54) DRIVE TRAIN OF HYBRID VEHICLE

(75) Inventors: Matthias Reisch, Ravensburg (DE); Andreas Männer, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 390 days.

(21) Appl. No.: 11/511,087

(22) Filed: Aug. 28, 2006

(65) Prior Publication Data

US 2007/0049445 A1 Mar. 1, 2007

(30) Foreign Application Priority Data

Aug. 29, 2005 (DE) .................. 10 2005 040 771

(51) Int. Cl.
*F16H 3/72* (2006.01)
(52) U.S. Cl. ......................................................... 475/5
(58) Field of Classification Search .............. 192/87.11, 192/48.8, 48.9, 48.91; 310/78; 475/5
See application file for complete search history.

(56) References Cited

U.S. PATENT DOCUMENTS

| | | | |
|---|---|---|---|
| 4,346,773 A * | 8/1982 | Hofbauer et al. ............ | 180/165 |
| 6,655,484 B2 * | 12/2003 | Levin ......................... | 180/65.2 |
| 6,863,140 B2 | 3/2005 | Noreikat et al. | |
| 7,293,637 B2 * | 11/2007 | Janson et al. ............ | 192/87.11 |
| 2002/0066607 A1 | 6/2002 | Levin | |

FOREIGN PATENT DOCUMENTS

| | | |
|---|---|---|
| DE | 29 25 675 | 2/1981 |
| DE | 32 30 607 A1 | 2/1984 |
| DE | 199 37 545 A1 | 2/2000 |
| DE | 100 05 582 A1 | 9/2001 |
| DE | 102 97 305 T5 | 2/2002 |
| DE | 101 60 466 C1 | 6/2003 |
| DE | 102 46 839 A1 | 4/2004 |
| FR | 2 862 025 | 5/2005 |
| FR | 2 862 026 | 5/2005 |
| JP | 2002-087080 | 3/2002 |
| JP | 2003-205756 | 7/2003 |

* cited by examiner

*Primary Examiner*—Dirk Wright
(74) *Attorney, Agent, or Firm*—Davis & Bujold, P.L.L.C.

(57) ABSTRACT

A drive train (1) of a hybrid vehicle having one internal combustion engine and one transmission (3), between the internal combustion engine and the transmission (3), at least one electric machine (7) with one stator (8) and one rotor (9) is situated wherein the rotor (9) can be connected by at least one friction clutch with a crankshaft (4) of the internal combustion engine and/or with an input shaft (16) of the transmission (3) and/or with a third shaft in which the rotor (9) is firmly connected with a rotor carrier (24) which supports component parts of the clutch on its radial inner side. The drive train is to be developed so that at least one wet-running clutch, actuatable by pressure medium, is situated so that it is very compactly designed and allows an active cooling of both the clutch discs and of the rotor carrier. The rotor carrier (24) is connected on its radial inner side with at least one part or designed integral therewith by way of the rotor carrier (24) directly and rotatably is supported upon at least one component of the drive train (1).

25 Claims, 1 Drawing Sheet

DRIVE TRAIN OF HYBRID VEHICLE

This application claims priority from German Application Serial No. 10 2005 040 771.4 filed Aug. 29, 2005.

FIELD OF THE INVENTION

The invention concerns a drive train of a hybrid vehicle.

BACKGROUND OF THE INVENTION

Drive trains for so-called hybrid vehicles have been known for a long time. Those vehicles have an internal combustion engine and at least one electric machine which, depending on the situation, can be used alternatively to each other or jointly for producing propulsion power for the vehicle to start the internal combustion engine and/or to generate electric energy for the main power system. As known already, the electric energy can be produced both in the operation of the internal combustion engine and also in the recuperation, that is, while driving the electric machine, by the wheels of a power-off rolling vehicle.

DE 102 46 839 A1 thus discloses a power train of a hybrid vehicle that forms the preamble having one internal combustion engine and one transmission which are situated between one torsional vibration damper, two electric machines and one clutch. The electric machine closest to the transmission especially has one stator fixed to the housing and one rotor, the latter being connected with a rotor carrier. The rotor carrier has one hub section non-rotatably connected with a two-part transmission input shaft. Radially within the rotor carrier is situated one dry clutch actuatable via a release linkage by way of a release device. The rotor carrier has a radially inwardly pointing support for two discs of the dry clutch. Besides, an inner toothing is formed on the radial inner side of the rotor carrier in which engages an outer toothing of an intermediate pressure plate axially situated between the clutch discs.

This in itself is an advantageous construction principle of a clutch located radially within a rotor carrier of an electric machine in which component parts of the clutch are placed on the radial inner side of the rotor carrier is to be developed, according to the problem basis of the invention, for lodging two wet-running clutches actuatable by pressure medium in a manner such that it is altogether very compact allowing an active cooling of both the clutch discs and the rotor carrier.

SUMMARY OF THE INVENTION

According to the features of the main claim, therefore, the invention departs from a drive train of a hybrid vehicle having one internal combustion engine and one transmission in which, for example, between the internal combustion engine and the transmission, at least one electric machine with a stator and a rotor are located wherein the rotor can be connected by way of at least one friction clutch with the crankshaft of the internal combustion engine and/or with the input shaft of the transmission and/or with a third shaft, and in which the rotor is firmly connected with a carrier which on its radial inner side supports component parts of the clutch. According to the invention, the rotor carrier is now provided that the rotor carrier be connected on its radial inner side with at least one part or iw designed integral therewith by way of which the rotor carrier is directly rotatably supported upon at least one component of the drive train.

According to the construction, differing from the prior art, the rotor is not non-rotatably connected with a transmission input shaft, but is rotatably supported on at least one other part of the drive train. The torque is transmitted to the rotor carrier or away from the rotor carrier, via other parts, which will be discussed herebelow.

According to a special alternative, it is provided that the rotor carrier be connected on its radial inner side with at least one bearing carrier which extends radially inwardly and is supported on a radial bearing.

According to another alternative, this drive train is designed so that the rotor carrier is connected on its radial inner side in the area of its axial ends with respective bearing carriers that extend radially inwards and each is supported on a radial bearing. The two bearing carriers serve to divert radial forces on the rotor carrier in the direction to the transmission housing.

Another feature of the invention provides that the bearing carrier axially facing the internal combustion engine supports itself, via a radial bearing on one stator carrier, which supports the stator of the electric machine radially outside the rotor. By virtue of this construction, the stator carrier is advantageously used also as a bearing element for the rotor carrier.

In addition, it can be provided in this connection that on its radial end, remote from the transmission housing, the stator carrier supports a short inner disc carrier shaft, via another radial bearing. The two radial bearings are advantageously situated axially in substantially the same place in the drive train.

One other feature of the drive train provides that the inner disc carrier shaft is connected with driving effect with the output member of a torsional vibration damper, the input member which non-rotatably communicates with the crankshaft of the internal combustion engine. The inner disc shaft can have a blind hole pointing in direction to the transmission input shaft in which the end of the transmission input shaft on the side of the internal combustion engine is lodged in a low-friction bearing bush. This design implements an axially and radially very compact construction.

It is further provided that the bearing carrier facing the transmission is supported, via an added radial bearing, on a part fixed to the transmission housing. The part can be, for example, the housing of an oil pump.

It is also deemed advantageous that axially between the two bearing carriers, a cylinder part is attached to the rotor carrier which radially outside is non-rotatably fastened on the radial inner side of the rotor carrier and radially inside is situated with radial play or via a low-friction bearing on the transmission input shaft.

According to another feature of this invention, it is provided that at least one wet-running friction clutch is situated axially next to the bearing carrier close to the internal combustion engine and/or to the bearing carrier close to the transmission and/or to the cylinder part. The wet-running friction clutches are known to have each clutch disc forming a set which are alternatively fastened radially outside and radially inside on the clutch disc carriers.

In this drive train is now advantageously provided that, on the inner disc carrier shaft, the inner disc carrier of the friction clutch, close to the internal combustion engine, is fastened or designed integral therewith, while the inner disc carrier of the friction clutch, close to the transmission, is non-rotatably connected with the input shaft of the transmission.

Moreover, this drive train is where the bearing carrier, close to the transmission, is designed as an actuation cylinder for actuating the friction clutch close to the transmission and the cylinder part as an actuation cylinder for actuating the friction clutch close to the internal combustion engine. In each actuation cylinder, one piston is tightly and axially movably accommodating, which is individually pressurizable with actuating pressure by way of a hydraulic oil. In addition, the actuation cylinders define, together with the respective pistons, pressure and pressure-compensation spaces, a recoil spring is situated in the latter, acting upon the coordinated piston.

In a pressure build up in the pressure spaces, the pistons can be pressed against the disc sets for closing the respective clutches. The clutch disc sets, as already briefly indicated, are formed by clutch discs non-rotatably and axially movably disposed on the inner disc carriers or on the rotor carrier designed as a common outer disc carrier.

In a further development of the invention, it can also be provided that on one of the two bearing carriers, an axial extension is made against which the discs of the friction clutch can be pressed, close to the internal combustion engine.

In addition, it is deemed advantageous that the axial end stop for the discs of a friction clutch is formed by an end disc situated on the radial inner side of the rotor carrier and axially secured to the rotor carrier by a guard ring.

To ensure the cooling of both the disc sets and the rotor carrier or the rotor of the electric machine with coolant oil possible, it is also provided that on the bearing carrier close to the transmission and on the cylinder part, baffle plates are fastened of the pressure-compensation spaces which have holes through which the hydraulic oil from respective pressure-compensation spaces, where the respective recoil springs for each piston are located, can reach as coolant oil both wet-running friction clutches and the rotor carrier.

Another feature of the invention provides that on the radial inner side an inner axial toothing in which engage outer axial toothings of the outer discs of the two friction clutches and/or of the longitudinal stops for the outer discs and/or of the two bearing carriers. The inner axial toothing and the outer axial toothings here consist, for example, of axial grooves made at least in the part over the respective periphery. This construction makes possible not only an axially movable accommodation of the clutch discs on the inner side of the rotor carrier, but also takes care of centering and fastening each bearing carrier.

According to another alternative, the cylinder part is also provided with an axial outer toothing and is therewith accommodated in the inner axial toothing of the rotor carrier. This construction also facilitates the assembly of the drive train.

In order to secure at least one of the two bearing carriers axially and/or the cylinder part on the rotor carrier after assembly thereof, according to another feature, it is provided that for the purpose guard rings are available which engage on the related peripheral grooves on the radial inner side of the rotor carrier.

Another advantageous development of the invention provides that on the stator carrier a rotation angle sensor is fastened with which the passing movements of an axial toothing made on the rotor carrier or a radial sine geometry and/or cosine geometry can be detected as rotation angle information of the rotor. This axial toothing or sine geometry and/or cosine geometry is made, for example, on a section close to the internal combustion engine of the rotor carrier on the radial inner side thereof.

Let it also be pointed out in this place that the transmission is designed, for example, as automatic transmission.

Another feature of this drive train, according to the invention, is characterized by there being made essentially radially extending apertures in the rotor carrier through which the oil can pass. Besides, the inner axial toothing in the rotor carrier is preferably designed for guiding oil to the apertures in the rotor carrier. The oil here is the oil exiting from the pressure-compensation spaces of the clutch actuation systems and can also be used as pressure medium for actuating the pistons.

Let it finally be mentioned that the rotor carrier is made as one made by broaching, by way of a broaching tool, from a solid workpiece or by shaping of a solid workpiece or sheet metal workpiece.

BRIEF DESCRIPTION OF THE DRAWING

The invention will now be described, by way of example, with reference to the accompanying drawing in which.

DETAILED DESCRIPTION OF THE INVENTION

Figure 1:
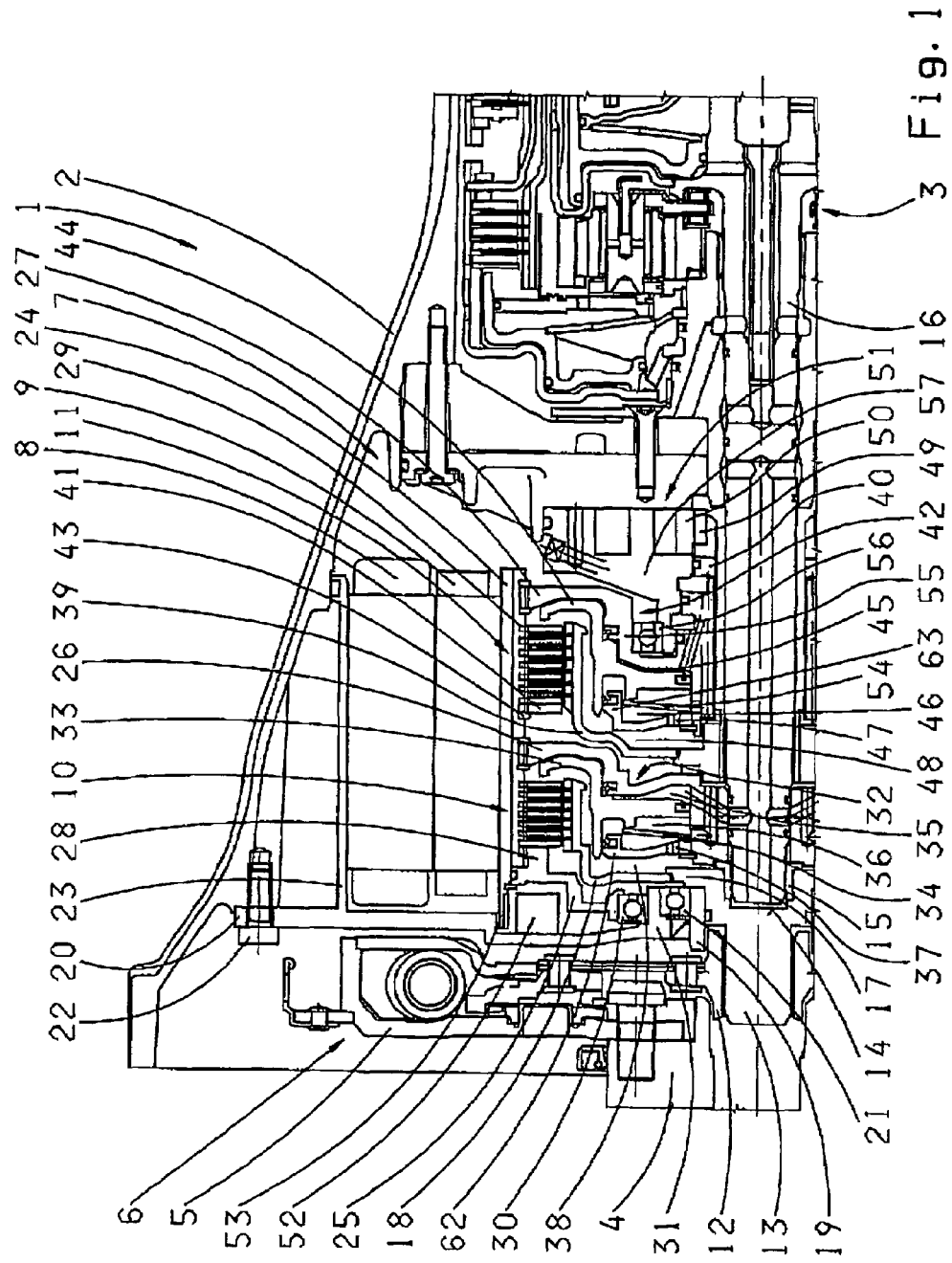
FIG. 1 shows an essential area of the hybrid train 1 in longitudinal section which is lodged in a transmission housing 2 of an automatic transmission 3.

The internal combustion engine of this hybrid drive train 1 is indicated to the left in the drawing only by a crankshaft 4 thereof which is non-rotatably connected with an input member 5 of a torsional vibration damper 6. On the right side of the drawing is indicated a multi-gear automatic transmission 3 in planetary design whose construction is known per se and, therefore, will not be discussed further.

An electric machine 7 is situated between the torsional vibration damper 6 and the automatic transmission 3 and is designed as an asynchronizer machine or as synchronizer machine and, as already known, has one stator 8 fixed to the housing and one rotatably supported rotor 9. Radially within the rotor 9 are positioned two wet-running clutches 10 and 11 together with their actuation systems supported by pressure medium, which will be more precisely discussed herebelow.

An output member 12 of the torsional vibration damper 6 is non-rotatably connected, via a plug-in toothing (not indicated), with an axially short inner disc carrier shaft 13 which has, in direction to the automatic transmission 3, a central blind hole 14 where a low-friction bearing bush 15 is placed. The low-friction bearing bush 15 accommodates on the side of the internal combustion engine, an end of a transmission input shaft 16.

The inner disc carrier shaft 13 has a radial section 17 in the area of its end on the transmission side, a radial section 17 designed either integrally as an inner disc carrier 18 of the clutch 10 on the side of the internal combustion engine or non-rotatably connected with such an inner disc carrier 18. The inner disc carrier 18, on its radially outer section (not shown in detail), supports discs of the clutch 10 close to the internal combustion engine.

Axially adjoining the radial section 17, a suspension ring 19 is fastened on the inner disc carrier shaft 13, between which a stator carrier 20 and a radial bearing 21 are located. The stator carrier 20 is fastened at its radially outer end on the transmission housing 2, via screws 22, and supports the stator 8 on its axial section 23 of the electric machine 7.

The rotor 9 of the electric machine 7 is situated radially within the stator 8 and is fastened on a rotor carrier 24. The rotor carrier 24 supports itself radially inwardly via two bearing carriers 25 and 27 of which one bearing carrier 25 is situated close to the internal combustion engine and a second bearing carrier 27 close to the transmission.

The bearing carrier 25, close to the internal combustion engine, is firmly connected on its radially outer end with the rotor carrier 24 and has in this embodiment, pointing in direction to the transmission, an axial extension 28, which radially outside its centering, engages in an inner axial toothing 29 of the rotor carrier 24. The axial extension 28 also serves as an axial stop surface for the discs of the clutch 10 close to the internal combustion engine, the outer discs of which are non-rotatably and axially movably fastened in the inner axial toothing 29 of the rotor carrier 24.

The radial inner end of the bearing carrier 25 close to the internal combustion engine and substantially designed disc shaped rests on the outer ring of another radial bearing 30 whose inner ring supports itself upon the radial outer side of a cylindrical section 31 of the stator carrier 20. As it can be seen from the FIGURE, both radial bearings 21 and 30 close to the internal combustion engine, axially observed, are disposed on the same site in the drive train on both sides of the cylindrical section 31 of the stator carrier 20.

In the drawing to the right, next to the inner disc carrier 18 of the clutch 10 close to the internal combustion engine, a cylinder part 26 appears which is radially disposed inside with radial play via the central transmission input shaft 16 and is centered and retained by its radially outer end with an outer axial toothing in the inner axial toothing 29 of the rotor carrier 24. As the drawing further makes clear, the cylinder part 26 is designed as an actuation cylinder 32 of a hydraulically actuatable piston-cylinder system with which the clutch 10 close to the internal combustion engine can be actuated.

Within the cylinder 32, an axially movable piston 33 is located which is pressurized with a recoil force by a recoil spring 34 in actuation direction. Here the piston 33 separates a space 35 for actuation of same from an axially opposite pressure-compensation space 36 in which the recoil spring 34 is also placed. Both the pressure space 35 and the pressure-compensation space 36 can be supplied with hydraulic oil via holes (not shown in detail), in the cylinder 32 and in the central transmission input shaft 16.

The pressure-compensation space 36 is defined by a baffle plate 62 axially in direction to the crankshaft 4 connected with the cylinder part 26. The baffle plate 62 has holes 37 through which the hydraulic oil from the pressure-compensation space 36 can arrive at a clutch space 38 and thus close to the internal combustion engine at the discs to be cooled of the clutch 10. The hydraulic oil guided there actively cools the rotor carrier 24 or the rotor 9 of the electric machine 7 for which radial apertures (not shown) are helpful in the rotor carrier 24. Seals (not indicated) tighten the piston 33 against the cylinder 32 and the baffle plate 62.

The wet-running clutch 11, disposed close to the transmission and radially beneath the rotor carrier 24, has one inner disc carrier 39 which is non-rotatably connected radially inside with the transmission input shaft 16 via a plug-in toothing. On its radial outer end, the inner discs (not shown in detail) are fastened which are alternatively situated between the outer discs of this clutch 11. The outer discs are accommodated in the already mentioned inner axial toothing 29 of the rotor carrier 24 and, together with an end disc and an end disc 41 remote from the transmission, are axially secured by a guard ring engaging in the rotor carrier 24.

For actuation aided by pressure medium of the clutch 11 close to the transmission in the drive train 1, a second piston-cylinder system is provided whose cylinder 42 is formed by the right bearing carrier 27 close to the transmission. This second clutch actuating system is designed to a great extent like the one for the first mentioned clutch 10. Accordingly, it comprises one piston 44, which is axially movably accommodated in the cylinder 42, is pressurized by a recoil spring 54 with recoil force, and divides the cylinder space into a pressure space 45 and an axially opposite pressure-compensation space 46. The pressure space 45 and the pressure-compensation space 46 can be supplied via holes (not shown in detail) in the cylinder 42 with a hydraulic medium which can flow out from the pressure-compensation space 46 for cooling the discs of the clutch 11 close to the transmission and of the rotor carrier 24 or of the rotor 9, via holes 47, in baffle plate 63 to a clutch space 48 of this clutch 11.

The bearing carrier 27 close to the transmission is disposed with radial play via the transmission input shaft 16 and has a cylindrical section 40 axially pointing inwardly to the automatic transmission 3. On the axial free end thereof are made radial engaging gears 49 which engage with a driving effect in an outer toothing of a pump gear 50 of an oil pump 51.

The bearing carrier 27 close to the transmission, in addition, has an axial section 55. It is supported therewith, via a radial bearing 56, upon a part fixed to the transmission which is here designed as an oil pump housing 57.

The drawing finally shows that on the stator carrier 20 a rotation angle sensor 52 is secured which extends axially in direction to the clutch 10 close to the internal combustion engine. The rotation angle sensor 52 can detect the passing motion of teeth of an axial toothing 53 of a radial sine geometry and/or a cosine geometry on the rotor carrier 24 and convey a rotation angle information in this connection to a transmission control unit. The axial toothing 53 or radial sine geometry and/or cosine geometry is made on the radial inner side of a section close to the internal combustion engine of the rotor carrier 24.

The proposed drive train is very compactly constructed mainly because of the arrangement axially next to each other of its two wet-running friction clutches 10, 11. Comparatively few separate parts are needed due to the double use of parts for support of the rotor carrier 24 and for design of a cylinder of an actuation system for a clutch.

The construction proposed, in addition, is characterized by a multiple use of hydraulic oil as pressure medium for the clutch actuation, as centrifugal oil for the pressure-compensation spaces, as cooling oil for the clutch discs and as cooling oil for the rotor carrier. By the design of the rotor carrier as an outer disc carrier for the clutch discs, both clutches can be made with advantageously large diameters.

REFERENCE NUMERALS 1 hybrid drive train
2 transmission housing
3 automatic transmission
4 crankshaft
5 input member of torsional vibration damper
6 torsional vibration damper
7 electric machine
8 stator
9 rotor
10 clutch close to the internal combustion engine, friction clutch
11 clutch close to the transmission, friction clutch
12 output member of torsional vibration damper
13 inner disc carrier shaft
14 blind hole
15 low-friction bearing bush
16 transmission input shaft
17 radial section on the inner disc carrier shaft
18 inner disc carrier of the clutch 10 close to the internal combustion engine
19 suspension ring
20 stator carrier
21 radial bearing
22 screw
23 axial section on the stator carrier 24 rotor carrier
25 bearing carrier
26 cylinder part
27 bearing carrier
28 axial extension on the bearing carrier close to the internal combustion engine
29 inner axial toothing of the rotor carrier
30 radial bearing
31 cylindrical section of the stator carrier
32 actuation cylinder for clutch 10
33 piston for clutch 10
34 recoil spring actuation system of the clutch 10
35 pressure space
36 pressure-compensation space
37 holes in the pressure-compensation space
38 clutch space of the clutch 10 close to the internal combustion engine
39 inner disc carrier of the clutch 11 close to the transmission
40 cylindrical section on the bearing carrier 27 close to the transmission
41 end disc
42 actuation cylinder
43 guard ring on the end disc 41
44 piston
45 pressure space
46 pressure-compensation space
47 hole in the pressure-compensation space
48 clutch space of the clutch 11 close to the transmission
49 engaging gears
50 pump gear
51 oil pump
52 rotation angle sensor
54 axial toothing, radial sine/cosine geometry
54 recoil spring
55 axial section of the bearing carrier close to the transmission
56 radial bearing
57 oil pump housing
62 baffle plate on the pressure-compensation space
63 baffle plate on the pressure-compensation space

The invention claimed is:

1. A drive train (1) of a hybrid vehicle, the drive train comprising an internal combustion engine and a transmission (3), at least one electric machine (7) located between the internal combustion engine and the transmission (3), the electric machine (7) having a stator (8) and a rotor (9), the rotor (9) is connected, by at least one friction clutch, to at least one of a crankshaft (4) of the internal combustion engine, an input shaft (16) of the transmission (3), and a third shaft, the rotor (9) is firmly connected with a rotor carrier (24) which on a radial inner side supports component parts of the friction clutch, the rotor carrier (24) is connected on a radial inner side with at least one part, by way of which the rotor carrier (24) is directly rotatably supported upon at least one component of the drive train (1).

2. The drive train according to claim 1, wherein the rotor carrier (24) is connected by the radial inner side with at least one bearing carrier which extends radially inside and is supported on a radial bearing.

3. The drive train according to claim 2, wherein the rotor carrier (24) is connected by the radial inner side in an area of axial ends with respective bearing carriers (25, 27) which extend radially inwardly and are supported upon at least one radial bearing (30, 56).

4. The drive train according to claim 3, wherein a bearing carrier (25) facing the internal combustion engine is supported via a radial bearing (30) on a stator carrier (20) which supports the stator (8) of the electric machine (7) radially outside the rotor (9).

5. The drive train according to claim 4, wherein the stator carrier (20) supports an inner disc carrier shaft (13) via one other radial bearing (21).

6. The drive train according to claim 5, wherein the inner disc carrier shaft (13) is drivingly connected effect with an output member (12) of a torsional vibration damper (6) whose input member (5) communicates non-rotatably with the crankshaft (4) of the internal combustion engine.

7. The drive train according to claim 1, wherein a bearing carrier (27) facing the transmission (3) is supported via a radial bearing (56) on a first part (57) fixed to a transmission housing.

8. The drive train according to claim 1, wherein one cylinder part (26) of a hydraulic actuation device is located axially between two bearing carriers (25, 27) which radially outside is non-rotatably fastened on a radial inner side of the rotor carrier (24) and which radially inside is disposed, with radial play, via a low-friction bearing on a transmission input shaft (16).

9. The drive train according to claim 1, wherein at least one wet-running friction clutch (10, 11) is located adjacent at least one of a bearing carrier (25) adjacent to the internal combustion engine, a bearing carrier (27) adjacent to the transmission, and a cylinder part (26).

10. The drive train according to claim 1, wherein an inner disc carrier (18) of a friction clutch (10) adjacent the internal combustion engine is one of fastened to an inner disc carrier shaft (13) or integral therewith.

11. The drive train according to claim 1, wherein an inner disc carrier (39) of the friction clutch (11) adjacent the transmission is non-rotatably connected with a transmission input shaft (16).

12. The drive train according to claim 1, wherein a bearing carrier (27) of the friction clutch (11) adjacent the transmission is an actuation cylinder (42) for actuating the friction clutch (11) adjacent the transmission.

13. The drive train according to claim 1, wherein a cylinder part (26) is actuation cylinder (32) for actuating the friction clutch (10) adjacent to the internal combustion engine.

14. The drive train according to claim 12, wherein two actuation cylinders (32, 42) each contain one piston (33, 34) which can be individually pressurized with actuation pressure via hydraulic oil and can be biased in an engaging direction against a force of a recoil spring (34, 54) coordinated with each of the two actuation cylinders and acting on clutch disc sets, the clutch disc sets having on both inner disc carriers (18, 39) and on the rotor carrier (24), designed as common outer disc carrier, non-rotatably and axially movably disposed clutch discs.

15. The drive train according to claim 1, wherein an axial extension (28) is provided on one of two bearing carriers (25, 27) against which discs of the friction clutch (10) adjacent the internal combustion engine can be pressed.

16. The drive train according to claim 1, wherein an axial end stop for discs of a friction clutch (11) is formed by an end disc (41) located on a radial inner side of the rotor carrier (24) and axially secured by a guard ring (43).

17. The drive train according to claim 1, wherein on a bearing carrier (27) adjacent the transmission and a cylinder part (26), baffle plates (62, 63) of pressure-compensation spaces (36, 46) are fastened which have holes (37, 47) through which hydraulic oil can be supplied as cool oil from the respective pressure-compensation spaces (36, 46), where recoil springs (34, 54) for respective pistons (33, 44) are located at both wet-running friction clutches (10, 11) and the rotor carrier (24).

18. The drive train according to claim 1, wherein the rotor carrier (24) has an inner axial toothing (29) on the radial inner side in which engages with outer axial toothings of at least one outer disc of two friction clutches (10, 11), of longitudinal stops (41, 28) for outer discs, of both carriers (25, 2), and of a cylinder part (26).

19. The drive train according to claim 1, wherein bearing carriers (25, 27) and a cylinder part (26) are axially secured to the rotor carrier (24) by guard rings.

20. The drive train according to claim 1, wherein a rotation angle sensor (52) is fastened on a stator carrier (20) and can detect rotation angle information from passing motions of an axial toothing (53) made on the rotor carrier (24) or radial sine geometry and cosine geometry.

21. The drive train according to claim 1, wherein at least one of axial toothing (53), sine geometry, and cosine geometry is made on the radial inner side of the rotor carrier (24).

22. The drive train according to claim 1, wherein the transmission (3) is an automatic transmission.

23. The drive train according to claim 1, wherein the rotor carrier (24) has substantially radially extending apertures through which oil can pass.

24. The drive train according to claim 22, wherein inner axial toothing (29) in the rotor carrier (24) conveys oil to apertures in the rotor carrier.

25. The drive train according to claim 1, wherein a rotor carrier (29) is formed by one of spaces of a solid workpiece, by shaping a solid workpiece, and a sheet metal workpiece.

* * * * *